Oct. 8, 1929. E. T. TERFRY 1,731,084
AUTOMOBILE HOISTING GEAR
Filed Nov. 8, 1926
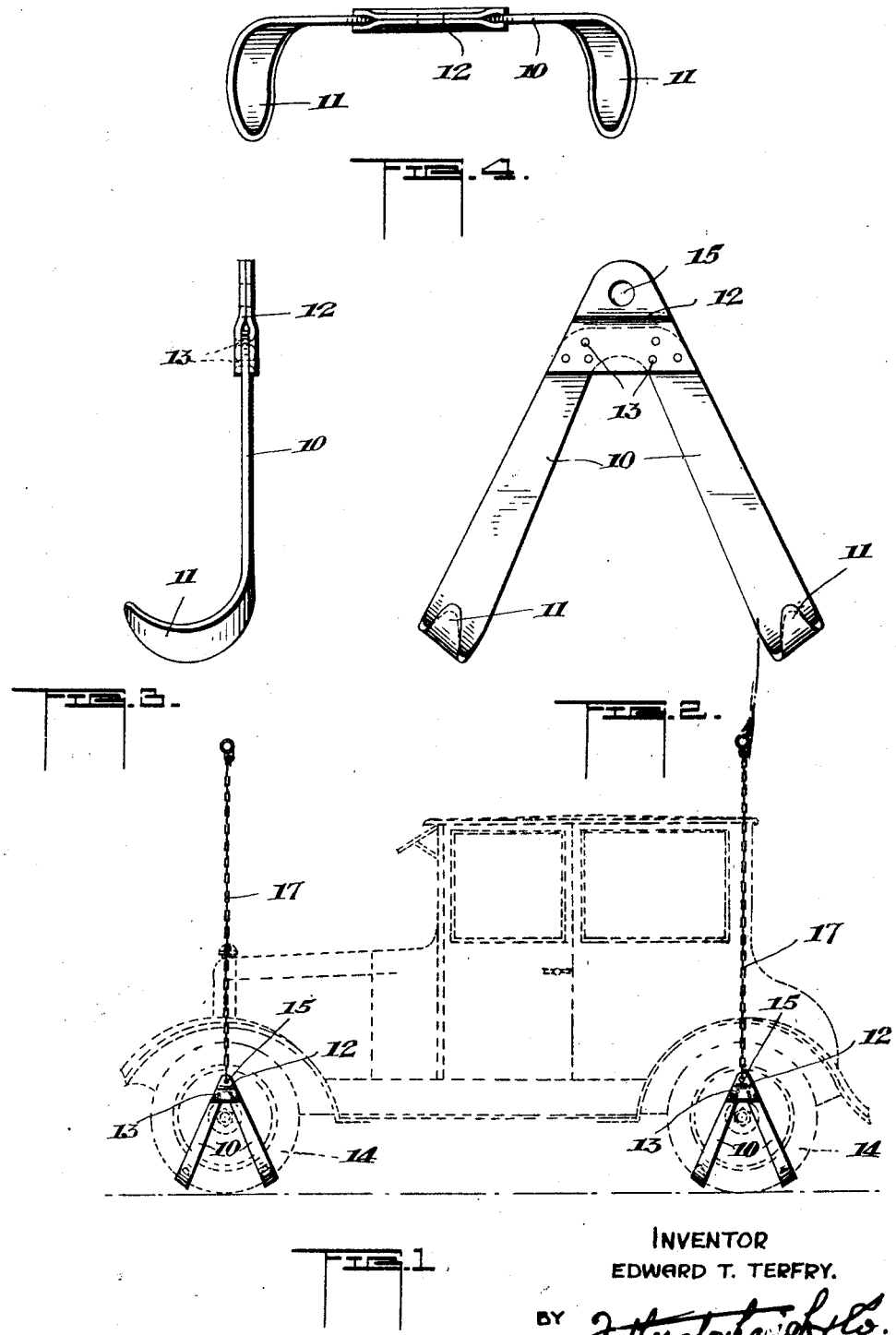
INVENTOR
EDWARD T. TERFRY.
BY
ATT'YS.

Patented Oct. 8, 1929

1,731,084

UNITED STATES PATENT OFFICE

EDWARD TRASK TERFRY, OF PARRSBORO, NOVA SCOTIA, CANADA

AUTOMOBILE HOISTING GEAR

Application filed November 8, 1926. Serial No. 147,114.

This invention relates to improvements in hoisting gears for automobiles, and the objects of the invention are to provide a hoisting gear for loading and unloading automobiles and motor vehicles from wharves, landings or other places of embarkation on to steamships, railway cars or any other conveyance.

Further objects are to provide a device of this character that can be used wherever and whenever it is necessary to load or unload motor vehicles conveniently and quickly.

A still further object is the provision of a hoist of this character of simple and durable construction that can be manufactured at very low cost.

With these and other objects in view, the invention consists of a pair of substantially J-shaped, or hooked plates, rigidly connected to one another, in inverted V-shaped formation, the apex being designed to engage with suspending means and to clear the hub of a wheel, the separate extremities of the plates engaging and gripping the wheels of an automobile.

Referring now to the drawings, in which like characters of reference indicate corresponding parts in each figure.

Figure 1 is a side elevation with dotted lines showing the outline of an automobile, and full lines my improved hoist secured to a front and rear wheel.

Figure 2 is a front elevation of the hoisting hook.

Figure 3 is a side view.

Figure 4 is a top plan view.

In the drawings, in which a substantially preferred example of my invention is illustrated, comprising two substantially J-shaped hook members formed from a flat plate 10 curved and bent at one end as at 11 and rigidly connected at the upper end by means of a plate or the like 12, with bolts or rivets therethrough as at 13.

It will thus be seen that while the unbent ends of the plates 10 are rigidly and fixedly joined together, the outer and bent ends 11 are separate, so that the device as a whole as illustrated in Figure 2, is in the form of an inverted V, the legs or arms of which are substantially curved, as already mentioned at the outer ends to engage an automobile wheel 14, a safe distance below a horizontal line through the hub. An opening 15 is provided in the apex of the plate 12 to connect with a chain 17 or other flexible medium, the apex at the same time clearing the hub of the wheel as shown in Figure 1.

In short my improved hoist comprises two substantially J-shaped hook or gripping members, formed from flat iron plates suitably and rigidly connected at their opposite ends and separated at the hooked ends, so as to grip in spaced relationship to one another the wheels of an automobile.

As many changes could be made in the above construction, and many apparently widely different embodiments of my invention, within the scope of the claim constructed without departing from the spirit or scope thereof, it is intended that all matter contained in the accompanying specification and drawings shall be interpreted as illustrative and not in a limiting sense.

What I claim as my invention is:

A hoisting device for automobiles and the like comprising a head plate of substantially triangular formation provided with sockets in each end and an orifice in the apex, extension plates rigidly secured to the head plate and having their outer ends bent to form rim engaging and clamping means, and flexible suspension means adapted to engage with the head plate to suspend the hoisting means.

In witness whereof I have hereunto set my hand.

EDWARD TRASK TERFRY.